Patented Dec. 4, 1951

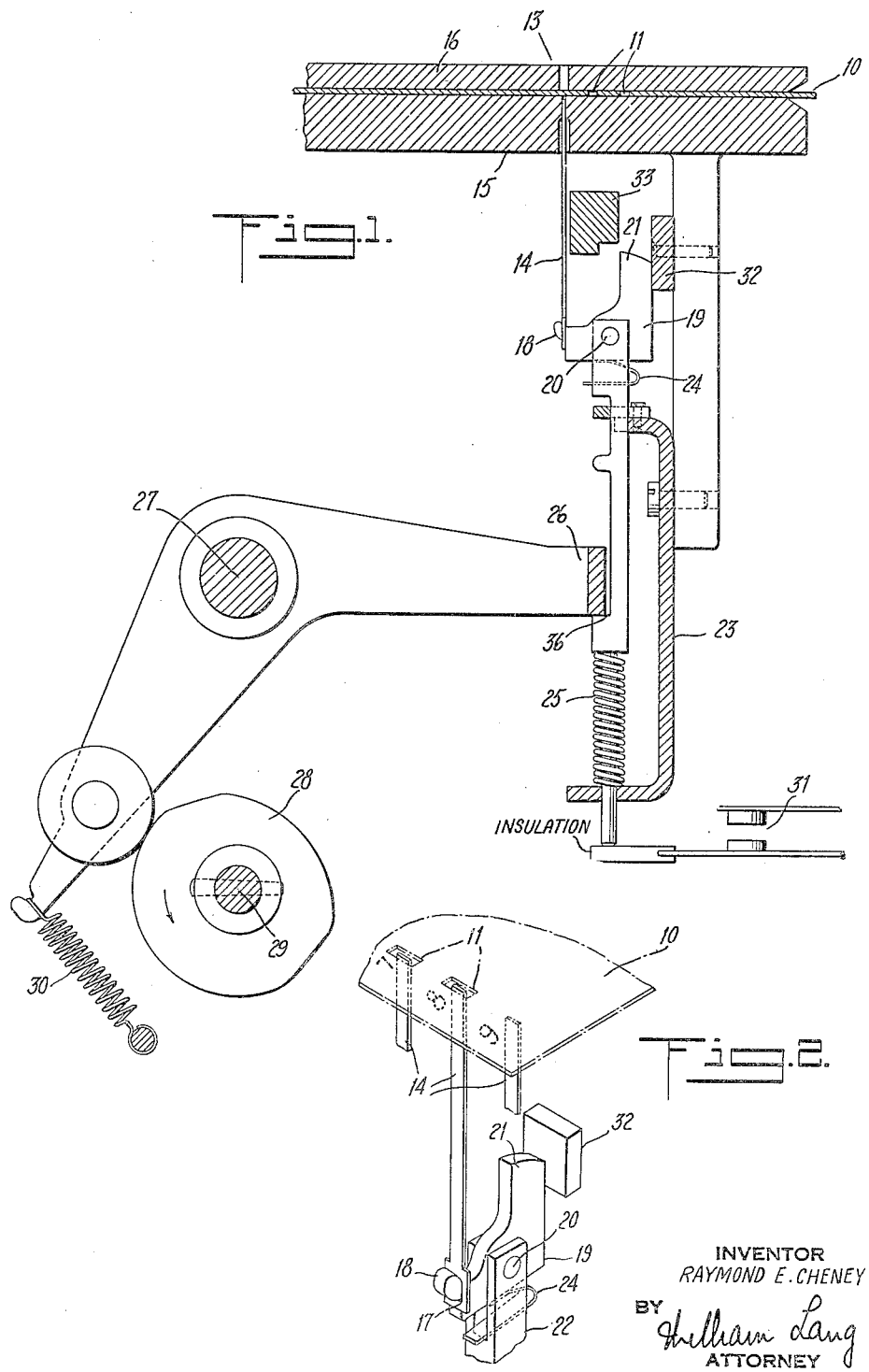

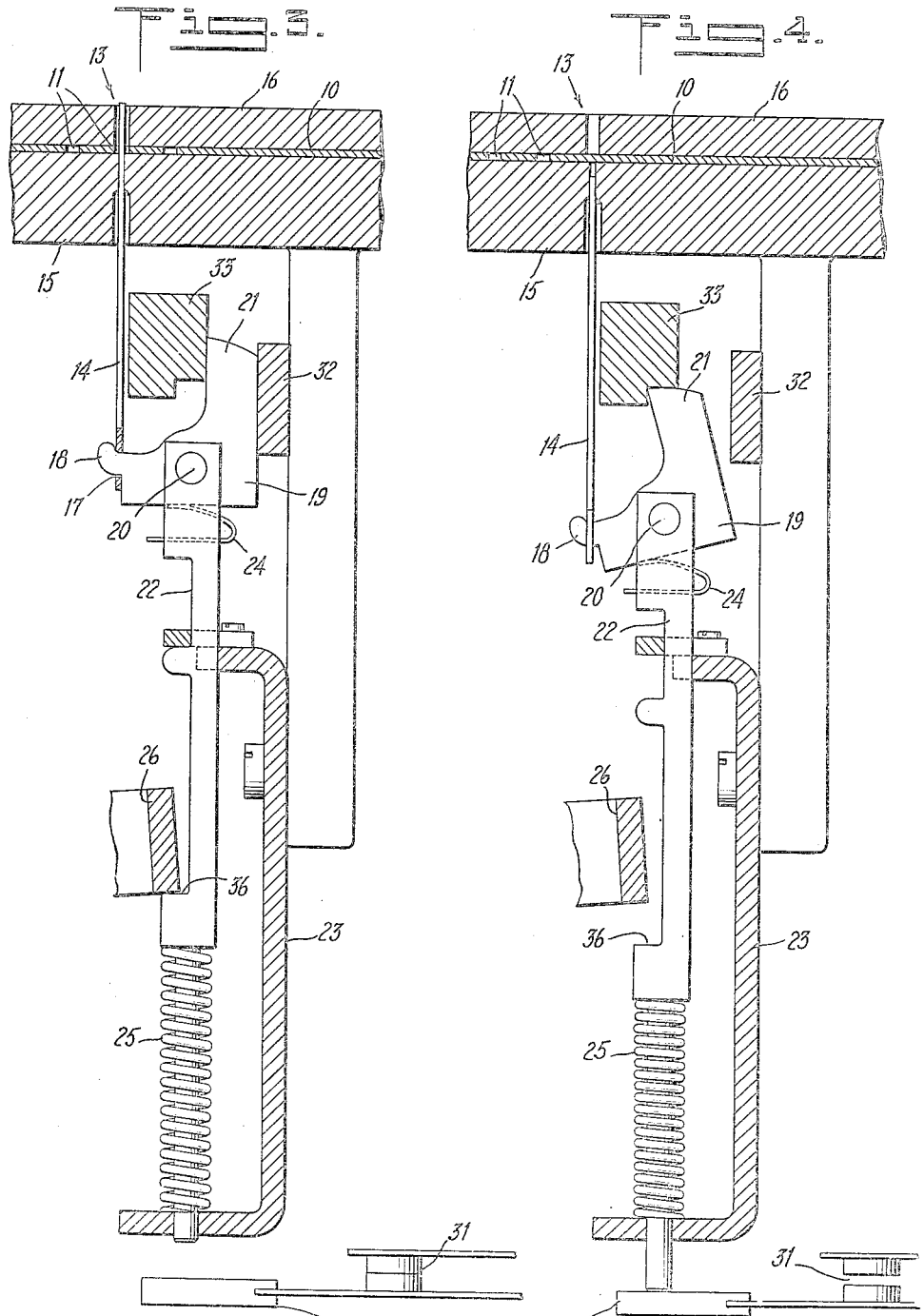

2,577,070

UNITED STATES PATENT OFFICE 2,577,070

MECHANICAL RECORD SENSING DEVICE

Raymond E. Cheney, Endicott, N. Y., assignor to International Business Machines Corporation, New York, N. Y., a corporation of New York Application May 19, 1950, Serial No. 163,061

9 Claims. (Cl. 235—61.11)

This invention relates to record sensing devices and more particularly to sensing devices in which perforated record cards are sensed by mechanical feelers or pins.

The principal object of the invention is to provide a mechanical sensing element and operating devices for the same whereby, when an element senses a perforation, it will pass therethrough with a predetermined force and, when the element encounters an imperforate part of the record, the force will be diverted, so that no pressure is exerted against the record.

In mechanical record sensing devices, it is desirable to provide sufficient pressure to insure that the sensing element will pass through a perforation and do work, but the same pressure, when applied against an imperforate portion of the record, has made an indentation which is objectionable.

With the arrangement of the present invention, the sensing pin or feeler is carried on one end of a lever whose other end is weighted. A spring acting at an intermediate point of the lever urges the lever and pin toward the card and, if a perforation is present, the pin passes therethrough under the full force of the spring. If no perforation is present, the pin strikes the record with only enough force to rock the lever which then, through the inertia of its weighted end, draws the pin out of engagement with the record and at the same time snaps under a stationary stop to interrupt further movement of the parts toward the record. The net result is to hold the pin slightly away from the record.

With such arrangement, the objectionable indenting is avoided without lessening the sensing pin operating force and enables the use of record material of much lighter stock than could be employed formerly, where the spring pressure that indented card stock would cause penetration of lighter stock.

Other objects of the invention will be pointed out in the following description and claims and illustrated in the accompanying drawings, which disclose, by way of example, the principles of the invention and the best mode, which has been contemplated, of applying that principle.

In the drawings:

Fig. 1 is a view of a sensing pin and the operating mechanism therefor with the parts in home position.

Fig. 2 is an isometric of the pin, lever and slide assembly.

Fig. 3 is an enlarged view of the sensing devices in position with the pin advanced through a perforation in a record.

Fig. 4 is a view similar to Fig. 3 with the parts shown in the position they occupy when a pin encounters an imperforate portion of the record.

A machine to which the mechanism of the present invention is applied is shown and described in the copending application of E. W. Gardinor et al., Serial No. 163,182, filed May 20, 1950, for a "Record Card Verifying Machine."

Referring to the drawings, 10 represents a record card of the well known type in which perforations 11 may be made in selected positions therein to represent various data. This card is advanced by suitable feeding mechanism to present the perforation receiving positions to a reading station generally designated 13. The feeding mechanism forms no part of the present invention, and it may be assumed that a record is placed in position as shown in the drawings manually.

At reading station 13 is a row of feeler pins or blades 14 guided at their upper ends in plate 15 and projectable through aligned openings in a top member 16, card 10 being positioned between the plate 15 and member 16. The lower end of the blade 14 has an enlarged head with an opening 17 therein fitted over the hooked arm 18 of a bell crank 19 which is supported by a pin 20.

The other arm 21 of bell crank 19 constitutes a weight which normally and constantly biases the bell crank in a clockwise direction about pin 20, against a stationary guide rail 32. The bell crank is located in a bifurcation in the upper end of a slide 22 which is guided for vertical reciprocation by a channel 23. A light leaf spring 24 located within the bifurcation in slide 22 serves to aid the clockwise biasing of the bell crank.

A spring 25 between the lower flange of channel 23 and a shoulder on slide 22 normally urges the slide upwardly against a bail 26 which is pivoted on shaft 27 and oscillated between the positions of Figs. 1 and 3 by the joint action of a cam 28 on shaft 29 and a spring 30.

The lower end of slide 22 may abut the lower blade of a pair of contacts 31 to normally hold them open and to enable closure thereof under their own resiliency when the slide is elevated in response to the sensing of a perforation. This contact may control a circuit for the performance of well known functions which do not form part of the present invention.

With the parts in their restored position of Fig. 1, a card 10 is placed in sensing position and shaft 29 is given a complete rotation. Assuming that there is a perforation 11 in line with feeler 14, as shaft 29 rotates, cam 28 enables spring 30 to rock bail 26 counterclockwise away from shoulder 32 of slide 22. Spring 25 is thus free to urge the slide upwardly and carry with it the bell crank 19 and feeler 14 with the parts maintaining their relative position of Fig. 1.

In the upward movement, the inertia of the unbalanced bell crank 19 tends to bias it clockwise to hold its arm 21 in contact with guide rail 32 along which it will slide to the position of Fig. 3 as the feeler 14 passes through the perforation 11. As a result of the elevation of slide 22, contacts 31 will close to complete a circuit. Upon the return of bail 26, it reengages shoulder 32 to draw the slide 22 and connected parts back to the position of Fig. 1, reopening contacts 31.

Assuming now that as slide 22 rises under the force of spring 25, the feeler strikes against the imperforate under surface of card 10. Further upward advance of the feeler is thereupon retarded so that, as the slide 22 and pivot pin 20 continue their advance, bell crank 19 will be rocked counterclockwise to swing its weighted arm 21 beneath a fixed stop bar 33. This will prevent further upward movement of slide 22 and the parts will be interrupted in the positions of Fig. 4, wherein slide 22 has not advanced sufficiently to close contacts 31.

It is to be particularly noted that the interception of feeler 14 resulted in a sudden counterclockwise impetus being given to the bell crank 19, and the inertia of the bell crank, overcoming the slight resistance of spring 24, will cause it to "overthrow" to the position of Fig. 4, and in doing so will draw feeler 14 down, away from the card to the position shown.

Bar 33 is notched at its lower right hand corner to limit the overthrow, and the parts are so proportioned that spring 25 will have urged the arm 21 against the upper surface of the notch where the pressure of spring 25 will hold it against clockwise turning until bail 26 restores the slide to its initial position of Fig. 1.

It is to be noted that, when feeler 14 strikes the under surface of card 10, the force to be overcome thereby is that required to rock bell crank 19 and comprises the light spring 24 and that the full force of the actuating spring 25 is not applied against the record. This enables the pin sensing of records of much lighter weight than the usual record card stock, since the turning force required to rock bell crank 19 counterclockwise is relatively small.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A record reading device comprising a slide, a feeler blade, an interposer between the slide and blade, a stationary stop, spring means for urging the slide, interposer and blade toward a record with a predetermined positional relationship, occurrence of a perforation in the record enabling the blade to pass therethrough, engagement of the blade with an imperforate part of the record blocking the blade against continued movement with the slide and causing the interposer to take a position between the slide and said stop, whereby the thrust of the slide is taken by the stop and the thrust against the blade is only sufficient to shift the interposer into stopping position.

2. A record reading device, including a sensing element mounted for movement against a record, a spring, a connection between the spring and element, said spring acting through said connection to move the element against the record and through a perforation therein, with the full effect of the spring tension, a fixed stop, and means controlled by the element upon encountering an imperforate part of the record for diverting the tension of the spring against said stop, whereby such tension is removed from the element and not applied against the record.

3. A record reading device for reading a position of a record card for the presence of a perforation therein, comprising a slide mounted for reciprocation, a lever pivoted thereto at a point intermediate the ends of the lever, a sensing element on one end of the lever, said lever being weighted at its other end to bias the same rotatably in one direction, a stationary stop, spring means for moving the slide toward a record to cause the element to pass through a perforation therein or to engage the record if no perforation is present, engagement of the element with the record causing the lever to rock in a direction opposite to its bias, into engagement with said stop to interrupt movement of the slide, inertia of the lever causing the same to reverse the direction of movement of the element to withdraw it from engagement with the record.

4. A record reading device for reading a position of a record card for the presence of a perforation therein, comprising a lever, a pivot pin intermediate its ends, said lever being weighted at one end, biasing the lever in one direction, means limiting the extent of said biasing movement, a sensing element extending from the other end, means for moving the pivot pin toward a record card, whereby the sensing element will engage the card and retard the said other end of the lever, and causing a rotation of the lever in a direction counter to its biased direction, inertia thereof causing the sensing element to withdraw from engagement with the card.

5. The invention set forth in claim 4 in which means is provided for stopping and holding the lever in the position to which it is rotated to thereby hold the sensing element out of engagement with the card.

6. A record reading device comprising an unbalanced weight, a reading element, means including said weight for moving the element against a record, said element upon contacting the record causing the weight to bear against the element in a direction opposite to its initial movement to thereby withdraw the element from contact with the record.

7. A record reading device for reading a position of a record card for the presence of a perforation therein, comprising a lever, a sensing element at one end of the lever, a weight at the other end of the lever, means engaging a point intermediate said ends for moving the lever, sensing element and weight toward the record, engagement of the sensing element with the record causing the lever to rock so that the weight thereon, through inertia, will overthrow and withdraw the sensing element from engagement with the record.

8. A record reading device for reading a position of a record for the presence of a perforation therein, comprising a lever, a sensing element at one end of the lever, a weight at the other end of the lever, a pivot intermediate the ends of the lever, means for effecting relative movement between a record and said sensing element to bring them into engagement with one another, engagement of the record with said element causing the lever to rock, so that the weight thereon, through inertia, will overthrow and draw the sensing element out of engagement with the record.

9. In a device of the class described, a feeler element, means for moving the same against a record with a predetermined force to sense for the presence or absence of a perforation therein, means controlled by said card and feeler when the feeler engages the record for rendering said moving means ineffective, and further means controlled by said card and feeler for applying a counter force to said feeler to move it away from the record.

RAYMOND E. CHENEY.

REFERENCES CITED

The following references are of record in the file of this patent:

UNITED STATES PATENTS

| Number | Name | Date |
| --- | --- | --- |
| 2,044,119 | Lasker | June 16, 1936 |